United States Patent
Kiyozaki

(10) Patent No.: US 11,380,321 B2
(45) Date of Patent: Jul. 5, 2022

(54) METHODS AND APPARATUS FOR A VOICE DETECTOR

(71) Applicant: SEMICONDUCTOR COMPONENTS INDUSTRIES, LLC, Phoenix, AZ (US)

(72) Inventor: Kenichi Kiyozaki, Mizuho (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 140 days.

(21) Appl. No.: 16/661,124

(22) Filed: Oct. 23, 2019

(65) Prior Publication Data

US 2021/0035574 A1    Feb. 4, 2021

Related U.S. Application Data

(60) Provisional application No. 62/881,497, filed on Aug. 1, 2019.

(51) Int. Cl.
| | |
|---|---|
| *G10L 25/78* | (2013.01) |
| *G10L 15/22* | (2006.01) |
| *H04J 3/06* | (2006.01) |

(52) U.S. Cl.
CPC ............ *G10L 15/22* (2013.01); *G10L 25/78* (2013.01); *H04J 3/0658* (2013.01); *G10L 2015/223* (2013.01); *G10L 2025/783* (2013.01); *G10L 2025/786* (2013.01)

(58) Field of Classification Search
CPC .............. G10L 2025/783; G10L 25/78; H04R 2460/03
See application file for complete search history.

(56) References Cited

U.S. PATENT DOCUMENTS

| | | | | |
|---|---|---|---|---|
| 5,991,718 | A * | 11/1999 | Malah | G10L 25/78 704/214 |
| 7,881,927 | B1 * | 2/2011 | Reuss | H04M 9/082 704/226 |
| 2007/0021958 | A1 * | 1/2007 | Visser | G10L 25/78 704/226 |
| 2010/0172506 | A1 * | 7/2010 | Iwano | H04R 25/552 381/313 |
| 2016/0267908 | A1 | 9/2016 | Borjeson | |
| 2018/0174583 | A1 | 6/2018 | Zhao | |

* cited by examiner

*Primary Examiner* — Feng-Tzer Tzeng
(74) *Attorney, Agent, or Firm* — Dickinson Wright PLLC

(57) ABSTRACT

Various embodiments of the present technology may provide methods and apparatus for a voice detector. The voice detector may provide a microphone and an audio processor. The microphone may provide an active signal generator configured to generate an active signal. The active signal may indicate when the signal level of detected audio is above or below a threshold level with a first state and a second state. The active signal may prevent activity at the microphone I/O interface and may prevent activity at the audio processor's internal logic.

17 Claims, 17 Drawing Sheets

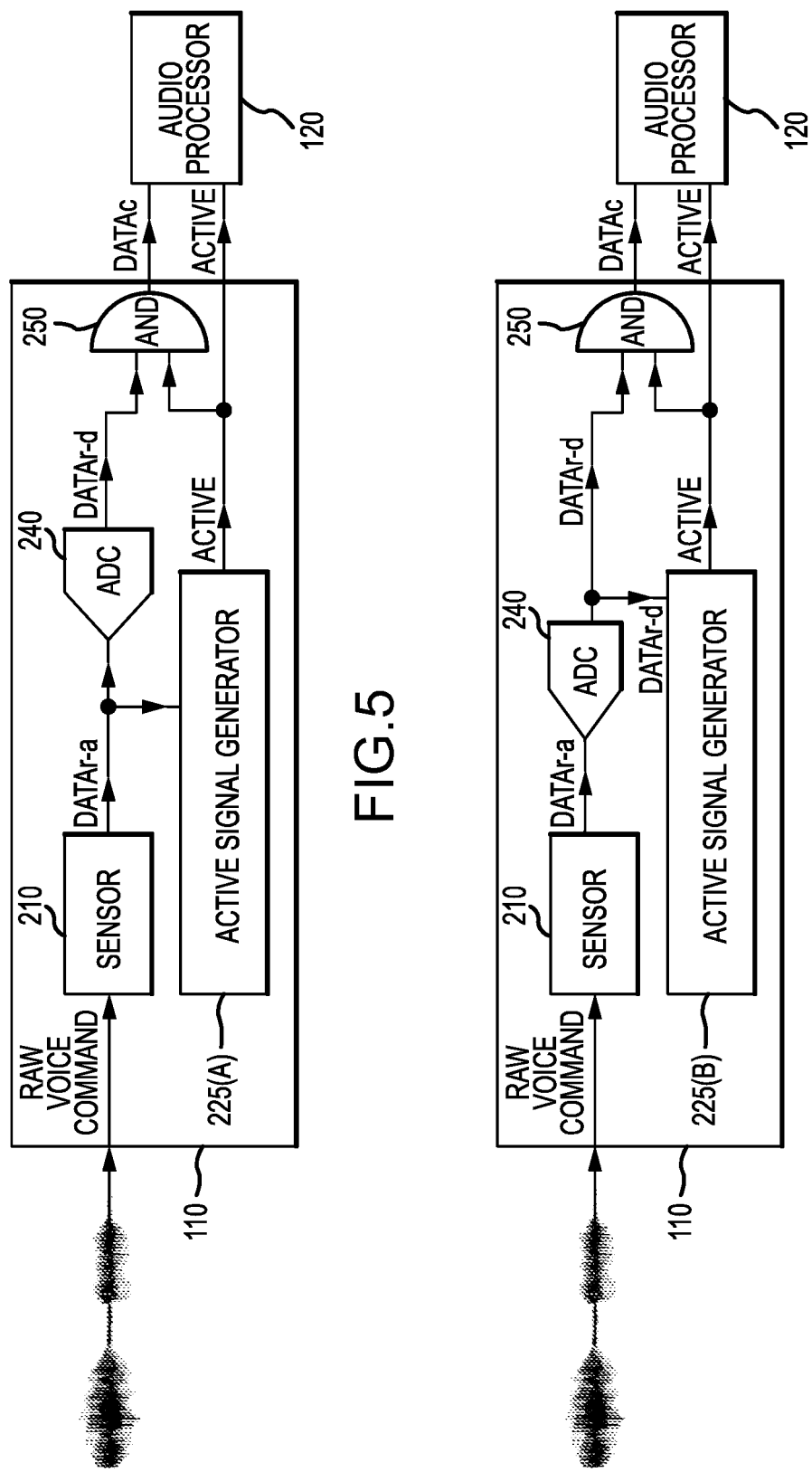

METHODS AND APPARATUS FOR A VOICE DETECTOR

CROSS-REFERENCE TO RELATED APPLICATIONS

This application claims the benefit of U.S. Provisional Patent Application No. 62/881,497, filed on Aug. 1, 2019, the entire contents of which is incorporated herein by reference.

BACKGROUND OF THE TECHNOLOGY

Many audio products have a voice command function to operate the product by voice. In conventional audio products, a microphone and an audio processor continuously listen for a voice to detect a command. These products integrate an "always-on" voice detection system as a part of the product. However, "always-on" voice detection systems continuously consume power. These systems have continuous activity at the microphone I/O interface and continuous activity in the audio processor's internal logic. Conventional audio processors need to listen for a voice continuously to detect a command and it must process voice data continuously from the microphone, consuming power. This power consumption shortens battery life.

SUMMARY OF THE INVENTION

Various embodiments of the present technology may provide methods and apparatus for a voice detector. The voice detector may provide a microphone and an audio processor. The microphone may provide an active signal generator configured to generate an active signal. The active signal may indicate when the signal level of detected audio is above or below a threshold level with a first state and a second state. The active signal may prevent activity at the microphone I/O interface and may prevent activity at the audio processor's internal logic.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates an audio system in accordance with various embodiments of the present technology;

FIG. 5 is a block diagram of a microphone in accordance with a first embodiment of the present technology;

FIG. 6 is a block diagram of a microphone in accordance with a second embodiment of the present technology;

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sensors, memories, signal generators, comparators, amplifiers, signal converters, controllers, clocks, processors, filters, transistors, resistive elements, switching devices, and the like, which may carry out a variety of functions. In addition, the present technology may be practiced in conjunction with any number of electronic systems, such as automotive, aviation, "smart devices," portables, speakers, earphones, headphones, and consumer electronics, and the systems described are merely exemplary applications for the technology.

Figure 1:
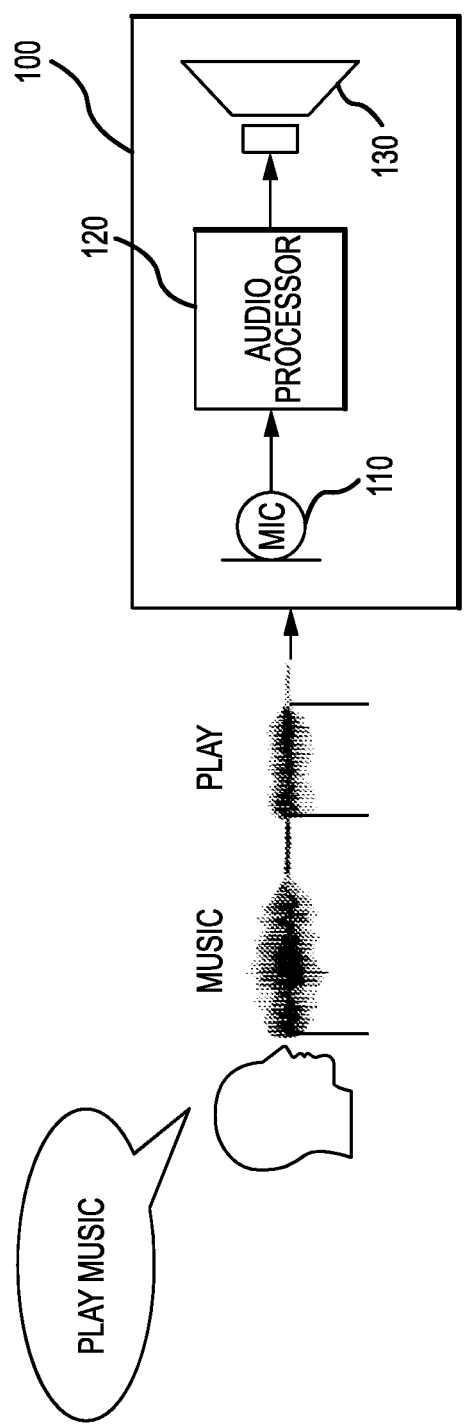

Methods and apparatus for a voice detector according to various aspects of the present technology may operate in conjunction with any suitable electronic system. For example, and referring to FIG. 1, an exemplary audio system 100 may comprise a microphone 110, an audio processor 120, and an external device 130. According to an exemplary embodiment, the microphone 110 may be coupled to the audio processor 120 and the audio processor 120 may be coupled to the external device 130.

The microphone 110 may detect a raw voice command from a user and generate a voice command signal in a voice-command-enabled consumer device. Such consumer devices may comprise earbuds, headphones, mobile phones, televisions, television remote controllers, smart speakers, tablets and personal computers. The audio processor 120 may receive the voice command signal from the microphone 110 and generate a processed voice command corresponding to the raw voice command detected by the microphone 110. The audio processor 120 may be embedded in the same voice-command-enabled user device as the microphone 110, or it may be within a separate voice-command-enabled consumer device.

In one example, the user may vocalize the raw voice command to a mobile phone. The mobile phone may contain an integrated circuit comprising both the microphone 110 and the audio processor 120.

In another example, the user may vocalize the raw voice command to "disable my WiFi at 10 AM" to the mobile phone. The mobile phone may comprise the microphone 110 and a transmitter (not shown) to transmit a voice command signal to a personal computer. The personal computer may comprise a transceiver (not shown) to receive the voice command signal and the audio processor 120. The audio processor 120 may then store and process the voice command signal and generate a system command to transmit a WiFi disabling signal to a WiFi router at 10 AM.

The audio processor 120 may also be coupled to the external device 130. The external device 130 may be integrated in a variety of electronic devices that perform a variety of functions according to the processed voice command received from the audio processor 120. Such electronic devices may comprise an earbud, earphone, speaker, personal computer, laptop, tablet, television, speaker, robotic device, automotive vehicle, aerospace vehicle, unmanned aerial aircraft, or satellite. The external device 130 may receive the processed voice command from the audio processor 120 and respond accordingly to the voice command.

In one example, the user may vocalize the raw voice command to "play music from my hard rock playlist" to a smart television remote controller. The smart television remote controller may contain the microphone 110 and a transmitter (not shown) to transmit a voice command signal to a smart television. The smart television may comprise the audio processor 120 and the external device 130. The audio processor 120 may then store and process the voice command signal and generate a system command to open an application and begin playing music from a playlist titled "hard rock" that is transmitted to a speaker.

In various embodiments, and referring now to FIGS. 5, 6, 11, 12, 17 and 18, the microphone 110 converts sound energy into electrical energy. For example, the microphone 110 may comprise a sensor 210, an analog-digital converter 240, and an active signal generator 225(A/B), such as a first active signal generator 225(A) or a second active signal generator 225(B).

In various embodiments, the sensor 210 may detect audio using any known method of audio sensing and generate a corresponding audio signal. For example, the sensor 210 may comprise a diaphragm that vibrates in response to sound waves or coils that change a magnetic field in response to sound waves. The sensor 210 may sense the raw voice command issued by the user and generate an analog voice command signal DATAr-a corresponding to the raw voice command.

The analog-digital converter 240 may convert an analog signal into a digital signal using any known process of analog-digital conversion. Such a process may comprise direct conversion, successive approximation, ramp compare, Wilkinson, integrating, delta-encoded, pipelined, sigma-delta, time interleaved analog-digital conversion, and the like. The analog-digital converter 240 input may be coupled to the sensor 210 output. In some embodiments, the analog-digital converter 240 output may be coupled to an AND gate 250. In other embodiments, the analog-digital converter 240 output may be coupled to the AND gate 250 and the second active signal generator 225(B). In other embodiments, the analog-digital converter 240 output may be coupled to a sound data write controller 730. In other embodiments, the analog-digital converter 240 output may be coupled to the sound data write controller 730 and the second active signal generator 225(B). The analog-digital converter 240 may convert the analog voice command signal DATAr-a received from the sensor 210 to a digital voice command signal DATAr-d.

The active signal generator 225(A/B) may comprise a threshold generator 220(A/B), such as a first threshold generator 220(A) and a second threshold generator 220(B), and a comparator 230(A/B), such as a first comparator 230(A) and a second comparator 230(B). According to an exemplary embodiment, the sensor 210 may be coupled to the analog-digital converter 240. In some embodiments, and referring to FIG. 5, the sensor 210 may be coupled to the first active signal generator 225(A). In other embodiments, and referring to FIG. 6, the analog-digital converter 240 may be coupled to the second active signal generator 225(B). In some embodiments, and referring to FIGS. 5 and 6, the analog-digital converter 240 and the active signal generator 225(A/B) may be coupled to the AND gate 250, and the AND gate 250 and the active signal generator 225(A/B) may be coupled to the microphone 110 output. In other embodiments, and referring to FIGS. 17 and 18, the analog-digital converter 240 and the active signal generator 225(A/B) may be coupled to the microphone 110 output without coupling to the AND gate 250.

In some embodiments, and referring to FIGS. 2, 5, 11 and 17, the first active signal generator 225(A) may be configured to compare the analog voice command signal DATAr-a with a threshold signal THRESH in the analog domain. The first active signal generator 225(A) may be further configured to generate a digital active signal ACTIVE with a first state indicating when the analog voice command signal DATAr-a is greater than the threshold signal THRESH and with a second state indicating when the analog voice command signal DATAr-a is less than the threshold signal THRESH. In some embodiments, the first state may be represented by the digital active signal ACTIVE being a high voltage and the second state may be represented by the digital active signal ACTIVE being a low voltage. In other embodiments, the first state may be represented by the digital active signal ACTIVE being a low voltage and the second state may be represented by the digital active signal ACTIVE being a high voltage. In embodiments where the first state is represented by the digital active signal ACTIVE being the low voltage and the second state is represented by the digital active signal ACTIVE being the high voltage and the ACTIVE signal is coupled to an input of the AND gate 250, a digital inverter (not shown) may be coupled between the ACTIVE signal and the AND gate 250.

In other embodiments, and referring to FIGS. 4, 6, 12 and 18, the second active signal generator 225(B) may be configured to compare the digital voice command signal DATAr-d with the threshold signal THRESH in the digital domain. The second active signal generator 225(B) may be further configured to generate the digital active signal ACTIVE with the first state indicating when the digital voice command signal DATAr-d is greater than the threshold signal THRESH and with the second state indicating when the digital voice command signal DATAr-d is less than the threshold signal THRESH. In some embodiments, the first state may be represented by the digital active signal ACTIVE being a high voltage and the second state may be represented by the digital active signal ACTIVE being a low voltage. In other embodiments, the first state may be represented by the digital active signal ACTIVE being a low voltage and the second state may be represented by the digital active signal ACTIVE being a high voltage. In embodiments where the first state is represented by the digital active signal ACTIVE being the low voltage and the second state is represented by the digital active signal ACTIVE being the high voltage and the ACTIVE signal is coupled to an input of the AND gate 250, a digital inverter (not shown) may be coupled between the ACTIVE signal and the AND gate 250.

Figure 2:
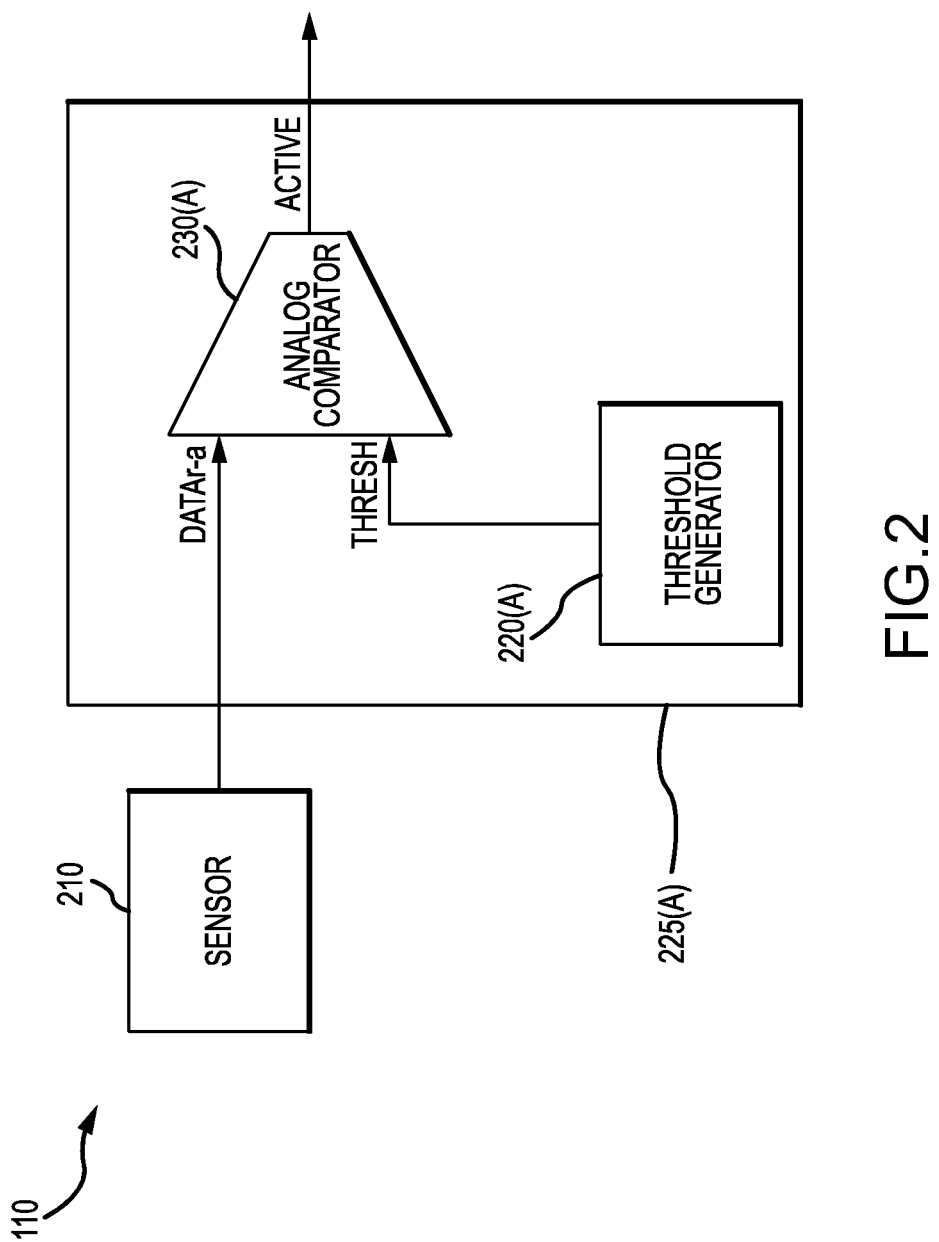
FIG. 2 is a simplified block diagram of an analog active signal generator in accordance with various embodiments of the present technology.

In various embodiments, and referring now to FIG. 2, the first active signal generator 225(A) may generate the digital active signal ACTIVE that indicates when the audio detected by the microphone 110 is a voice command. The digital active signal ACTIVE may achieve this by operating in the first state when the detected audio is a voice command and operating in the second state when the detected audio is a gap between words in a voice command or a gap between word commands. In some embodiments, the first state may be represented by the digital active signal ACTIVE being a high voltage and the second state may be represented by the digital active signal ACTIVE being a low voltage. In other embodiments, the first state may be represented by the digital active signal ACTIVE being a low voltage and the second state may be represented by the digital active signal ACTIVE being a high voltage. In embodiments where the first state is represented by the digital active signal ACTIVE being the low voltage and the second state is represented by the digital active signal ACTIVE being the high voltage and the ACTIVE signal is coupled to an input of the AND gate 250, a digital inverter (not shown) may be coupled between the ACTIVE signal and the AND gate 250.

In various embodiments, and referring to FIGS. 2, 5, 11, and 17, the first active signal generator 225(A) may comprise the first threshold generator 220(A) coupled to the first comparator 230(A). The first threshold generator 220(A) may generate an analog signal. The first threshold generator 220(A) may generate the threshold signal THRESH through a signal generator or by loading the threshold signal from an analog memory (not shown). The first comparator 230(A) may compare two random signals and generate a digital signal with the first state and the second state with each state corresponding to an outcome of the comparison. The first comparator 230(A) may be configured to receive the analog voice command signal DATAr-a from the sensor 210 and the threshold signal THRESH from the first threshold generator 220(A). The first comparator 230(A) may then generate the digital active signal ACTIVE with the first state indicating when the voice command signal DATAr-a is greater than the threshold signal THRESH and with the second state indicating when the analog voice command signal DATAr-a is less than the threshold signal THRESH. In some embodiments, the first state may be represented by the digital active signal ACTIVE being a high voltage and the second state may be represented by the digital active signal ACTIVE being a low voltage. In other embodiments, the first state may be represented by the digital active signal ACTIVE being a low voltage and the second state may be represented by the digital active signal ACTIVE being a high voltage. In embodiments where the first state is represented by the digital active signal ACTIVE being the low voltage and the second state is represented by the digital active signal ACTIVE being the high voltage and the ACTIVE signal is coupled to an input of the AND gate 250, a digital inverter (not shown) may be coupled between the ACTIVE signal and the AND gate 250.

Figure 3:
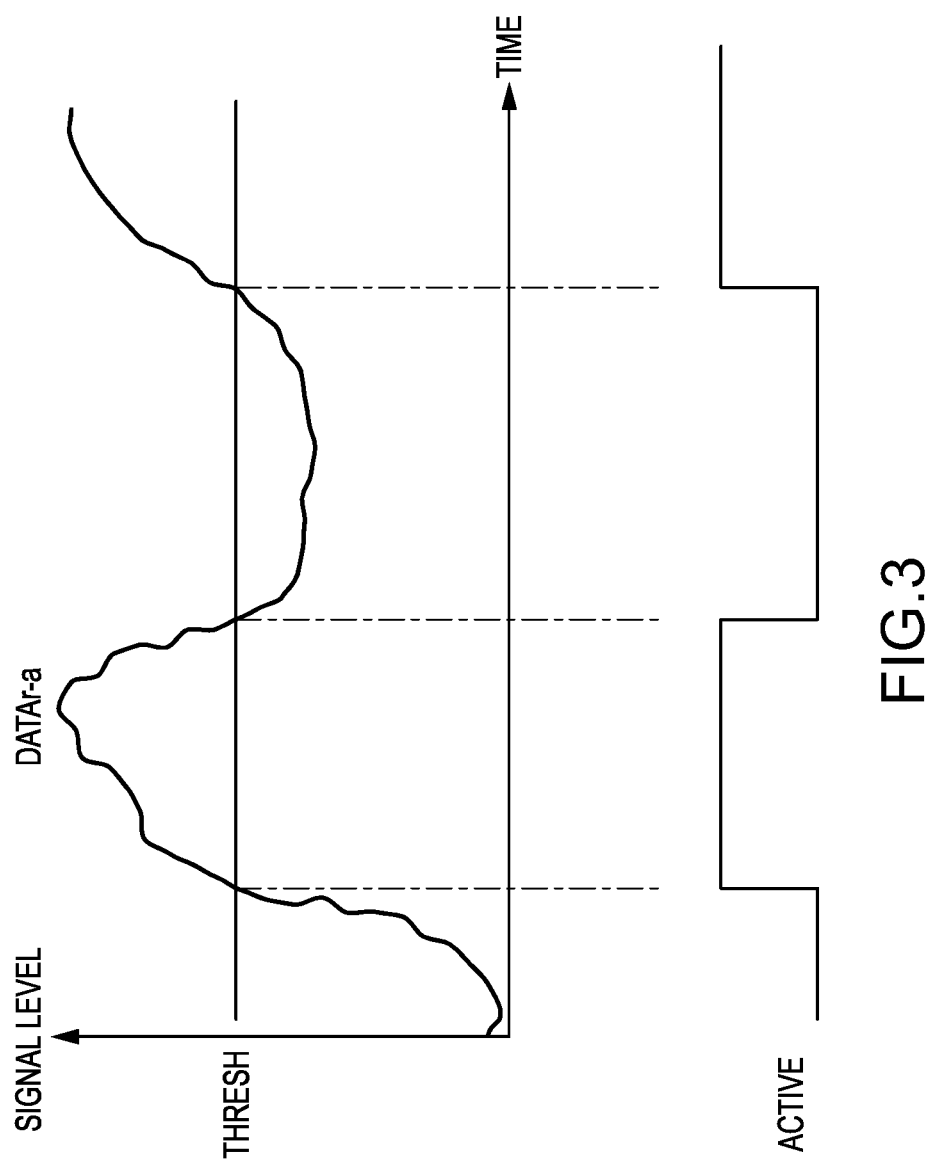
FIG. 3 is a diagram illustrating exemplary active signal generation in accordance with an exemplary embodiment of the present technology.
Figure 4:
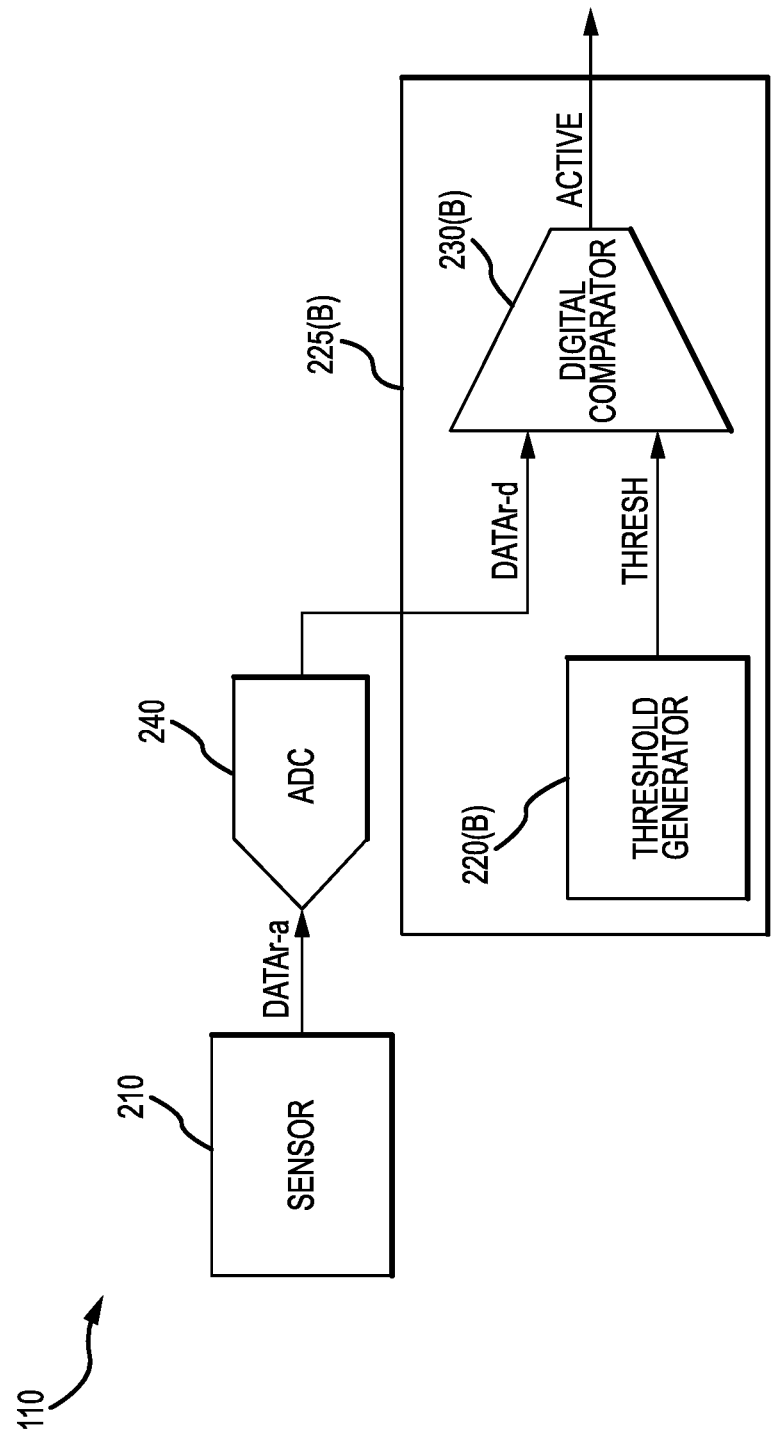
FIG. 4 is a simplified block diagram of a digital active signal generator in accordance with various embodiments of the present technology.

Referring now to FIG. 3, when the analog voice command signal DATAr-a becomes greater than the exemplary constant threshold signal THRESH, the digital active signal ACTIVE may switch from the second state (e.g., a low voltage) to the first state (e.g., a high voltage). When the analog voice command signal DATAr-a becomes lower than the exemplary constant threshold signal THRESH, the digital active signal ACTIVE may switch from the first state to the second state. In other embodiments, the digital active signal ACTIVE first state may be a low voltage and the digital active signal ACTIVE second state may be a high voltage.

Alternatively, the threshold signal THRESH may be vary with respect to time, frequency, or both time and frequency. In various embodiments, the threshold signal THRESH may be configured once. In other embodiments, hardware or software may reconfigure the first threshold generator 220(A) to generate a new threshold signal THRESH. For example, in some embodiments, a manufacturer, fabricator, or end user may use a software interface on a computer or a mobile application to reconfigure the threshold signal THRESH. In other embodiments, hardware may reconfigure the threshold signal THRESH in response to other system parameters or signals.

Figure 11:
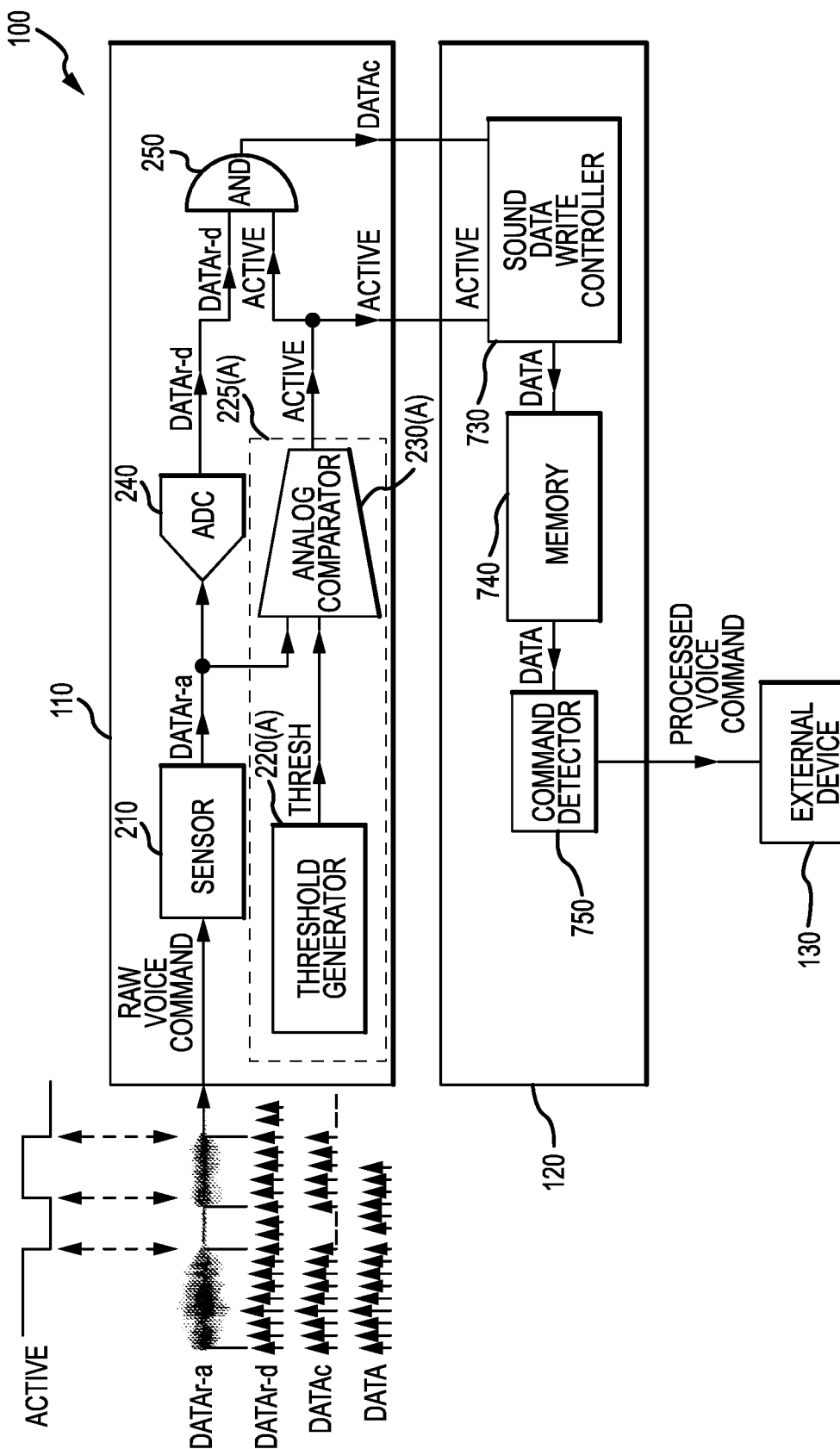
FIG. 11 is a block diagram of an audio system in accordance with the first embodiment of the present technology.
Figure 12:
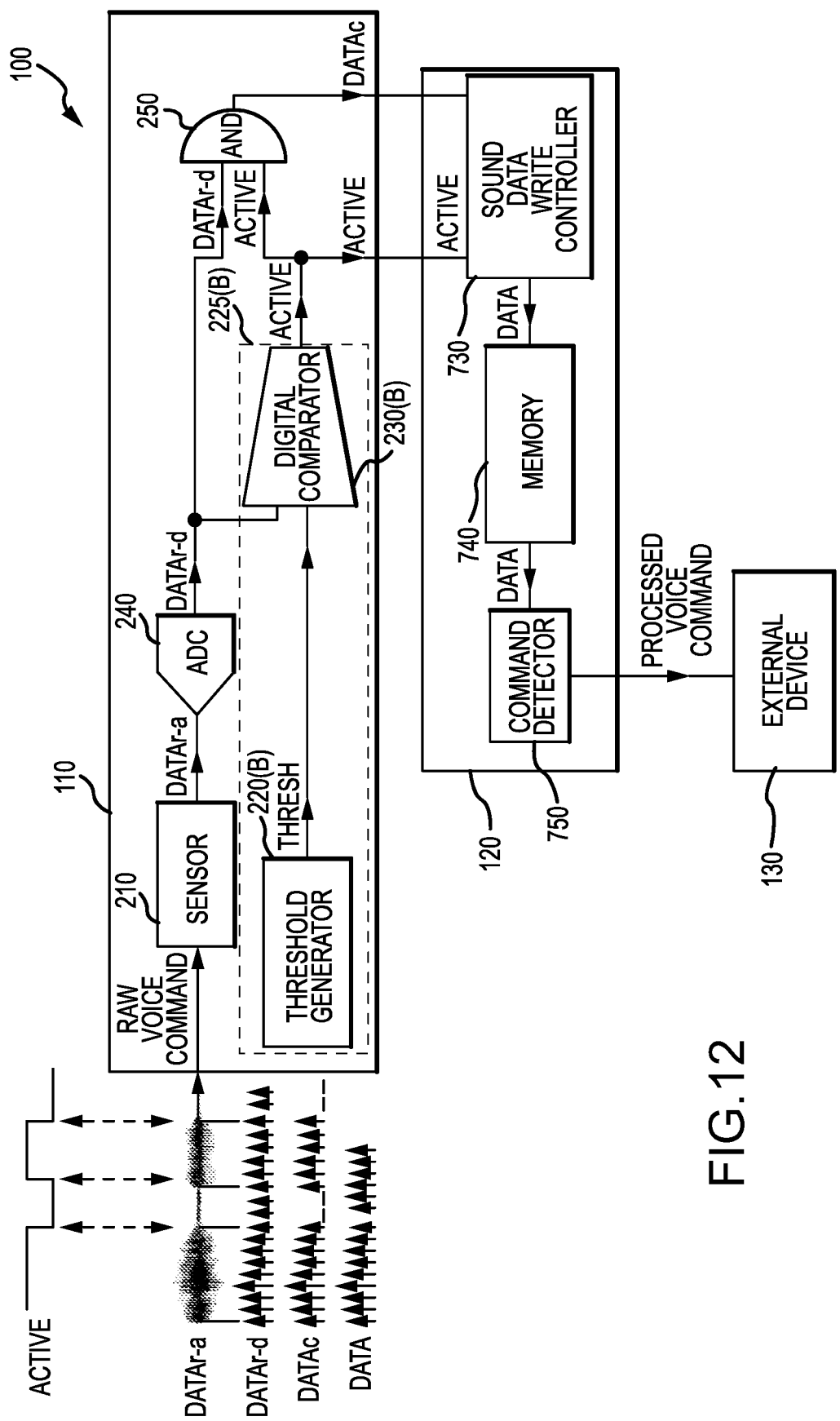
FIG. 12 is a block diagram of an audio system in accordance with the second embodiment of the present technology.

In some embodiments, and referring to FIGS. 11 and 12, the active signal generator 225(A/B) may transmit the digital active signal ACTIVE to the sound data write controller 730 and the AND gate 250. In other embodiments, and referring to FIGS. 17 and 18, the active signal generator 225(A/B) may transmit the digital active signal to the sound data write controller 730 and a clock controller 720.

In various embodiments, and referring to FIGS. 2, 5, 11 and 17, the first threshold generator 220(A) may comprise any known analog signal generator such as a function generator, arbitrary waveform generator, radio frequency signal generator, and microwave signal generator. In these embodiments, the analog signal generator may generate the threshold signal THRESH. In other embodiments, the first threshold generator 220(A) may comprise any known analog memory such as a mechanically orbited carbon random access memory, floating gate cell, storage capacitor, resistive random access memory and phase change memory. In the present case, the analog memory may store and load the threshold signal THRESH. The first threshold generator 220(A) may be coupled to the first comparator 230(A). Together, the first threshold generator 220(A) and the first comparator 230(A) may form the first active signal generator 225(A). The first active signal generator 225(A) may be embedded in the microphone 110.

In various embodiments, the first comparator 230(A) may be configured to receive the analog voice command signal DATAr-a and the threshold signal THRESH. In some embodiments, the first comparator 230(A) compares the signal level of the analog voice command signal DATAr-a and the threshold signal THRESH independent of frequency. In other embodiments, first comparator 230(A) may also be frequency dependent so that the first comparator 230(A) compares the signal level of the analog voice command signal DATAr-a and the threshold signal THRESH where the signal levels vary with respect to frequency.

For example, in some embodiments the threshold signal THRESH may be configured to a higher signal level at particular frequencies to effectively prevent analog voice command signal DATAr-a corresponding to raw voice commands made at acoustic frequencies too high or low for an average human vocal cord from triggering a change in the digital active signal ACTIVE state. In other embodiments, the threshold signal THRESH may be configured to a lower signal level at particular frequencies to effectively permit analog voice command signal DATAr-a corresponding to raw voice commands made at acoustic frequencies too high or low for an average human vocal cord but matching the acoustic frequencies of a user with a naturally higher or lower pitch or a user with vocal cord dysfunction.

The sensor 210 output and the first threshold generator 220(A) output may be coupled to the first comparator 230(A) input. In some embodiments, the first comparator 230(A) output may be coupled to the sound data write controller 730 and the AND gate 250. In other embodiments, the first comparator 230 output may be coupled to the sound data write controller 730 and the clock controller 720.

In various embodiments, referring now to FIGS. 4, 6, 12, and 18, the second active signal generator 225(B) may comprise a second threshold generator 220(B) coupled to the second comparator 230(B) and operate in the digital domain. The second threshold generator 220(B) may generate a digital signal. The second threshold generator 220(B) may generate the threshold signal THRESH through a signal generator or by loading the signal from a digital memory (not shown).

The second comparator 230(B) may compare two digital signals and generate a digital signal with the first state and the second state with each state corresponding to an outcome of the comparison. The second comparator 230(B) may be configured to receive the digital voice command signal DATAr-d from the analog-digital converter 240 and the threshold signal THRESH from the second threshold generator 220(B). The second comparator 230(B) may then generate the digital active signal ACTIVE with the first state indicating when the digital voice command data DATAr-a is greater than the threshold signal THRESH and with the second state indicating when the digital voice command signal DATAr-d is less than the threshold signal THRESH. In some embodiments, the first state may be represented by the digital active signal ACTIVE being a high voltage and the second state may be represented by the digital active signal ACTIVE being a low voltage. In other embodiments, the first state may be represented by the digital active signal ACTIVE being a low voltage and the second state may be represented by the digital active signal ACTIVE being a high voltage. In embodiments where the first state is represented by the digital active signal ACTIVE being the low voltage and the second state is represented by the digital active signal ACTIVE being the high voltage and the ACTIVE signal is coupled to an input of the AND gate 250, a digital inverter (not shown) may be coupled between the ACTIVE signal and the AND gate 250.

In various embodiments, the second threshold generator 220(B) may comprise any known digital signal generator, such as a function generator, vector signal generator, and digital pattern generator. In the present case, the second threshold generator 220(B) may generate the threshold signal THRESH. In other embodiments, the second threshold generator 220(B) may comprise any known digital memory such as a flash memory, read-only memory, programmable read-only memory, erasable programmable read-only memory, electrically erasable programmable read-only memory, dynamic random-access memory, static random-access memory and cache memory. In the present case, the digital memory may store and load the threshold signal THRESH.

In various embodiments, the second comparator 230(B) may be configured to receive the digital voice command signal DATAr-d and the threshold signal THRESH. In some embodiments, the second comparator 230(B) compares the signal level of the digital voice command signal DATAr-d and the threshold signal THRESH directly. In other embodiments, the second comparator 230(B) may compare a frequency-dependent raw voice command. For example, the second comparator 230(B) may compare the signal level of the digital voice command signal DATAr-d and the threshold signal THRESH, where the threshold signal THRESH varies with respect to corresponding raw voice command frequency. The digital voice command signal DATAr-d corresponds to the raw voice command, including audio volume and audio frequency. The second comparator 230(B) may compare segments of the digital voice command signal DATAr-d corresponding to different frequencies to segments of the threshold signal THRESH corresponding to matching frequencies.

In various embodiments the threshold signal THRESH may be set to a higher signal level at segments corresponding to particular frequencies to effectively prevent triggering a change in the digital active signal ACTIVE state by segments of the digital voice command signal DATAr-d corresponding to raw voice commands made at acoustic frequencies too high or low for an average human vocal cord. In other embodiments, the threshold signal THRESH may be configured to a lower signal level at segments corresponding to particular frequencies to effectively permit triggering a change in the digital active signal ACTIVE state by segments of digital voice command signal DATAr-d corresponding to raw voice commands made at acoustic frequencies too high or low for an average human vocal cord but matching the acoustic frequencies of a user with a naturally higher or lower pitch or a user with vocal cord dysfunction.

In various embodiments, referring now to FIGS. 5 and 6, the microphone 110 may further comprise the AND gate 250. The AND gate 250 may execute the logical AND between two digital signals. The analog-digital converter 240 and the active signal generator 225(A/B) may both couple to the AND gate 250.

Figure 7:
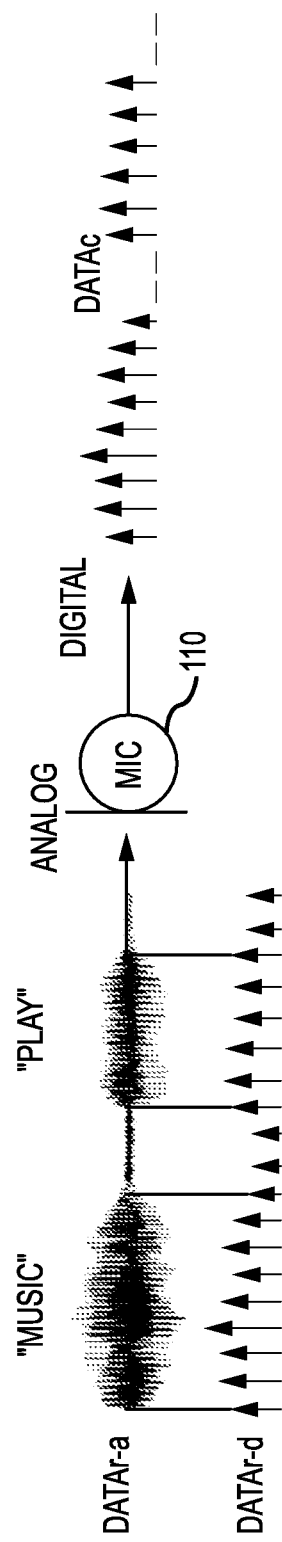
FIG. 7 is a diagram illustrating voice command signal modulation in accordance with various embodiments of the present technology.
Figure 8:
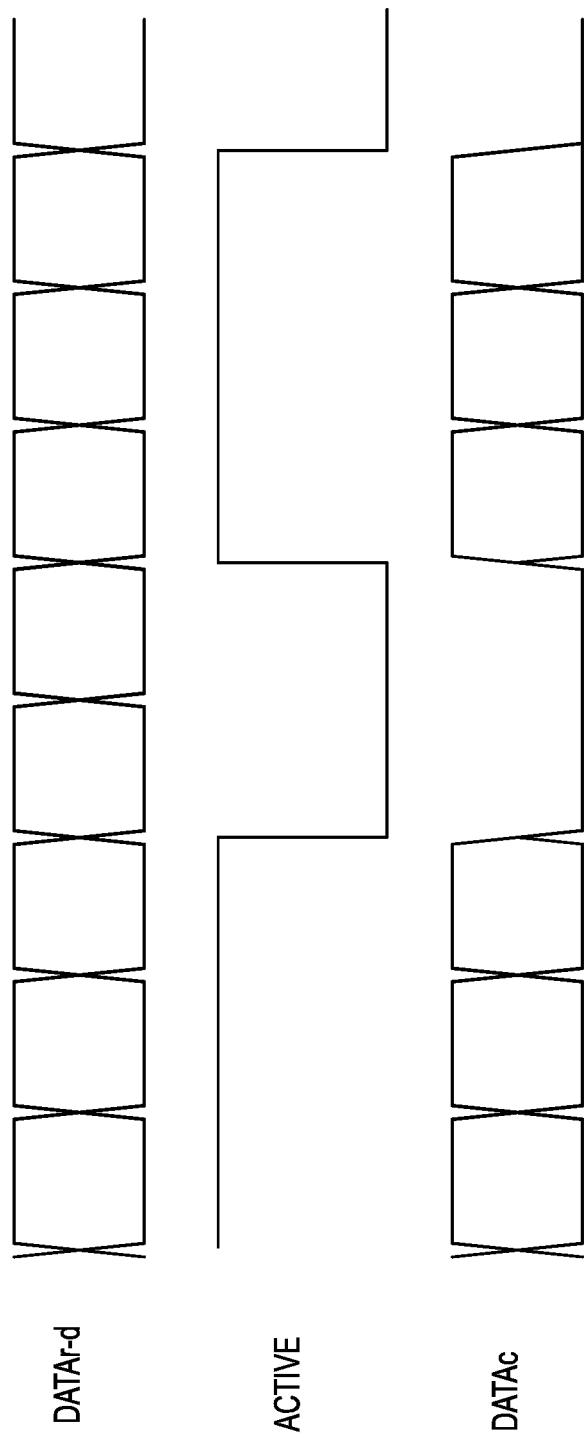
FIG. 8 is a signal diagram illustrating the relationship between microphone signals in accordance with an exemplary embodiment of the present technology.

Referring now to FIGS. 7 and 8, the AND gate 250 may transform the digital voice command signal DATAr-d into a cleaned voice command signal DATAc by executing the logical AND between the digital voice command signal DATAr-d and the digital active signal ACTIVE. The cleaned voice command signal DATAc and the digital active signal ACTIVE may be generated at the microphone 110 output. The cleaned voice command signal DATAc may have low power null signals rather than higher power signals in the segments corresponding to gaps between words in the voice command. Embodiments of the present technology may save power by transmitting the low power null signals rather than the segments of the digital voice command signal DATAr-d that correspond to gaps between words.

Figure 9:
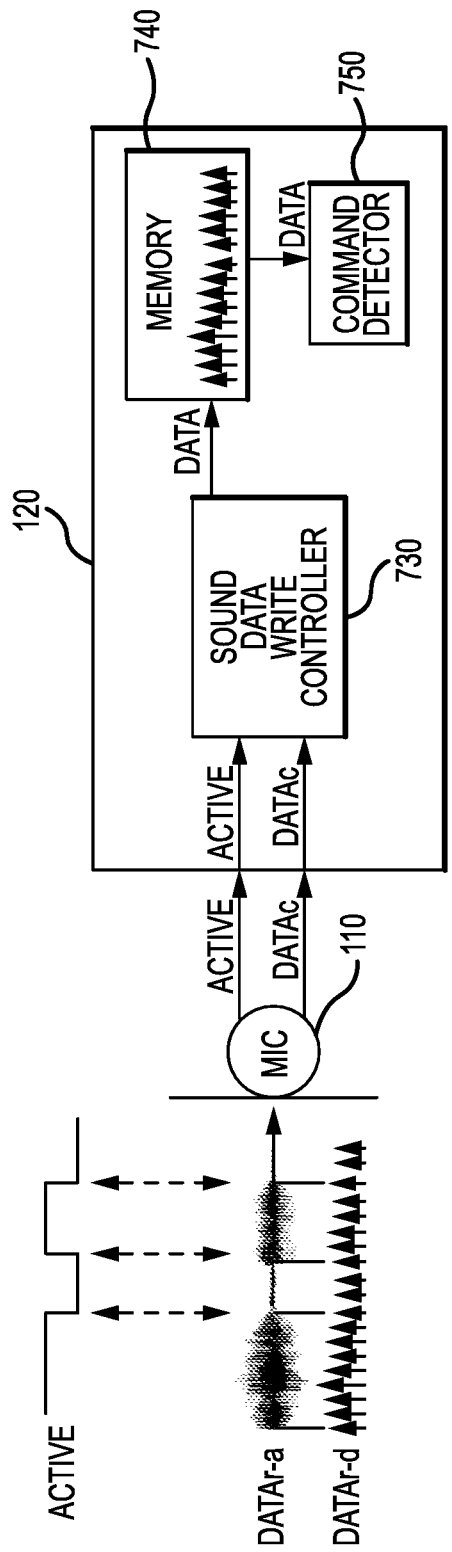
FIG. 9 is a block diagram of an audio processor in accordance with various embodiments of the present technology.

In various embodiments, referring now to FIG. 9, the audio processor 120 may comprise the sound data write controller 730, a memory 740, and a command detector 750. The audio processor 120 may process a voice command signal to detect the raw voice command corresponding to the voice command signal. According to an exemplary embodiment, the sound data write controller 730 may be coupled to the memory 740, and the memory 740 may be coupled to the command detector 750. The sound data write controller 730 may selectively permit writing data (corresponding to the voice command signal) to the memory 740 and prevent writing data (corresponding to the voice command signal) to the memory 740. The memory 740 may store data written by the sound data controller 730 and load the data to the command detector 750. The command detector 750 may execute digital signal processing functions on data loaded from the memory 740 to detect the voice command (corresponding to the raw voice command) detected by the sensor 210.

Figure 16:
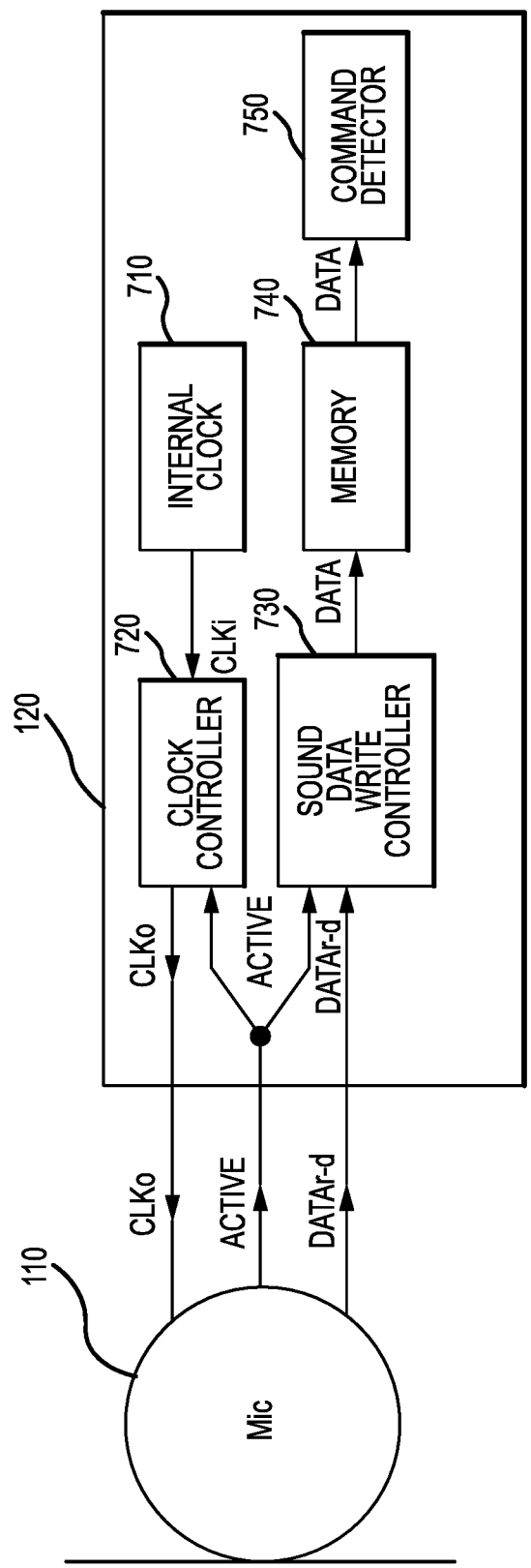
FIG. 16 is a block diagram of an alternative audio processor in accordance with various embodiments of the present technology.

In some embodiments, referring now to FIG. 16, the audio processor 120 may further comprise an internal clock 710 and a clock controller 720. The internal clock 710 output may be coupled to the clock controller 720 input. The clock controller 720 may also be coupled to the microphone 110 input and output.

Figure 10:
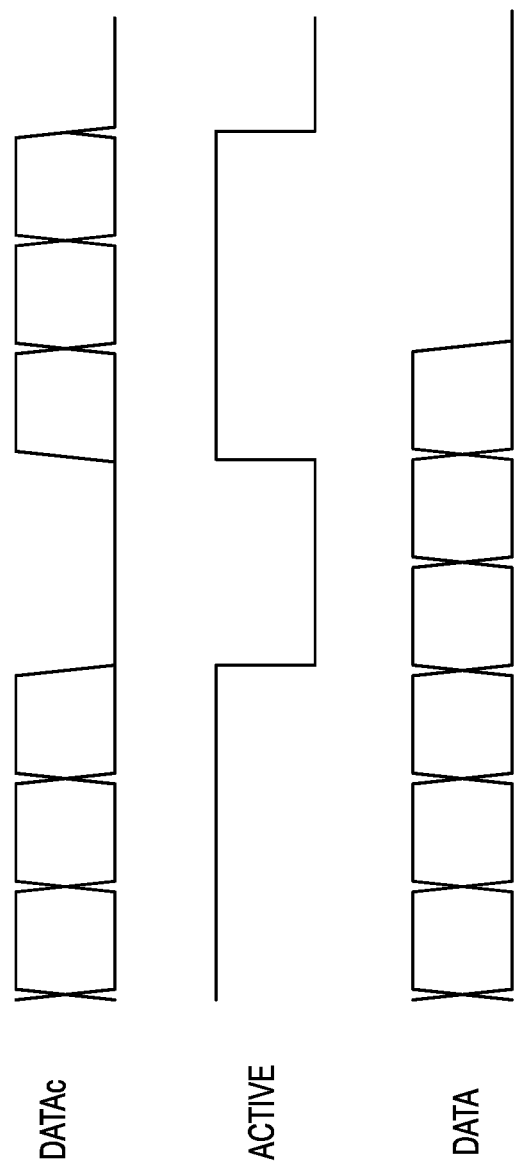
FIG. 10 is a signal diagram illustrating the relationship between audio processor signals in accordance with an exemplary application of the present technology.

In various embodiments, referring now to FIGS. 9 and 10, the sound data write controller 730 may be configured to write voice command data DATA to the memory 740. In an exemplary embodiment, the sound data write controller 730 may receive the cleaned voice command signal DATAc and the digital active signal ACTIVE from the microphone 110 output. The sound data write controller 730 may also be configured to write voice command data DATA to the memory 740 from the cleaned voice command signal DATAc when the digital active signal ACTIVE is in the first state and prevent writing voice command data DATA to the memory 740 when the digital active signal ACTIVE is in the second state. In other words, the sound data write controller 730 operates according to the active signal ACTIVE, such that in one state (e.g., first state), the active signal ACTIVE activates the sound data write controller 730, and in the remaining state (e.g., the second state), the active signal ACTIVE keeps the sound write controller 730 in a slumber mode.

The voice command data DATA written to the memory 740 may comprise the segments of the cleaned voice command signal DATAc that correspond to a word in the raw voice command, while segments of the cleaned voice command signal DATAc that correspond to a gap between words in the raw voice command are prevented from being written to the voice command data DATA. Embodiments of the present technology may save power by halting activity in the audio processor 120 internal logic when it would store, load, or process data corresponding to gaps between words. As such, the voice command data DATA that is written to the memory 740 is written in succession, without gaps between the data segments.

In various embodiments, the memory 740 may comprise any suitable digital memory such as a flash memory, read-only memory, programmable read-only memory, erasable programmable read-only memory, electrically erasable programmable read-only memory, dynamic random-access memory, static random-access memory, and cache memory, and the like. The memory 740 may be configured to store the voice command data DATA written by the sound data write controller 730. The memory 740 may be further configured to load the voice command data DATA to the command detector 750.

In various embodiments, the command detector 750 may be configured to implement any suitable process for voice activity detection and may comprise any known digital signal processor. The command detector 750 may be configured to retrieve or otherwise receive the voice command data DATA from the memory 740 and execute a voice activity detection process to determine what voice command (e.g., "play music") is represented by the voice command data DATA. The command detector 750 may be further configured to generate the processed voice command. In some embodiments, the command detector 750 may be configured to transmit the processed voice command to the external device 130. The external device 130 may be configured to respond according to the received processed voice command and execute a corresponding process.

In various embodiments, the AND gate 250 may generate the cleaned voice command data DATAc. In other embodiments, the AND gate 250 and its function may be replaced by an external clock signal CLKo transmitted to the microphone 110.

Figure 13:
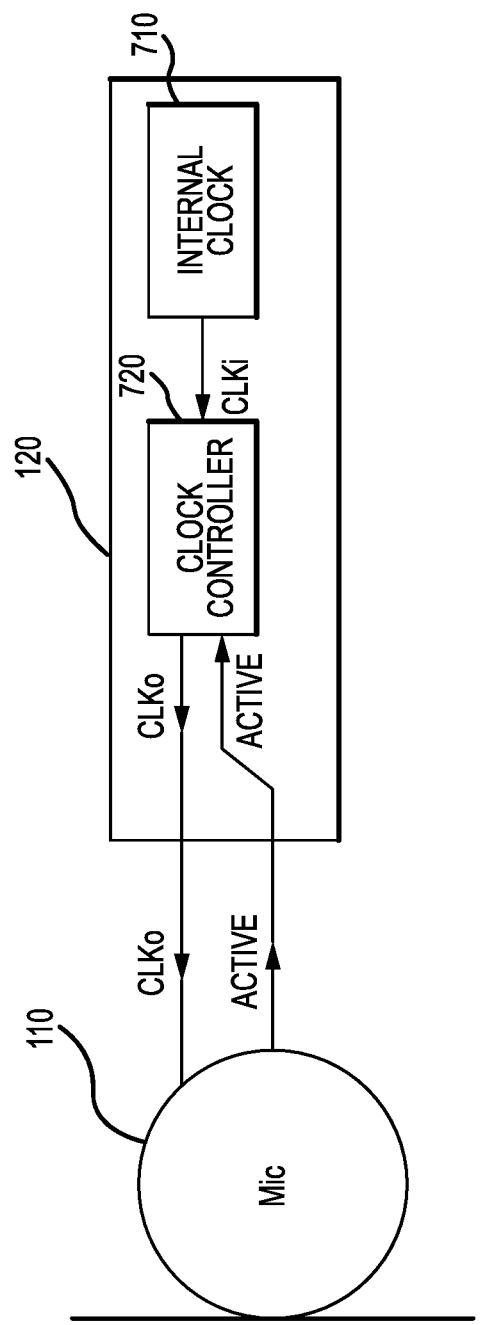
FIG. 13 is a block diagram of a clock generator in accordance with various embodiments of the present technology.
Figure 14:
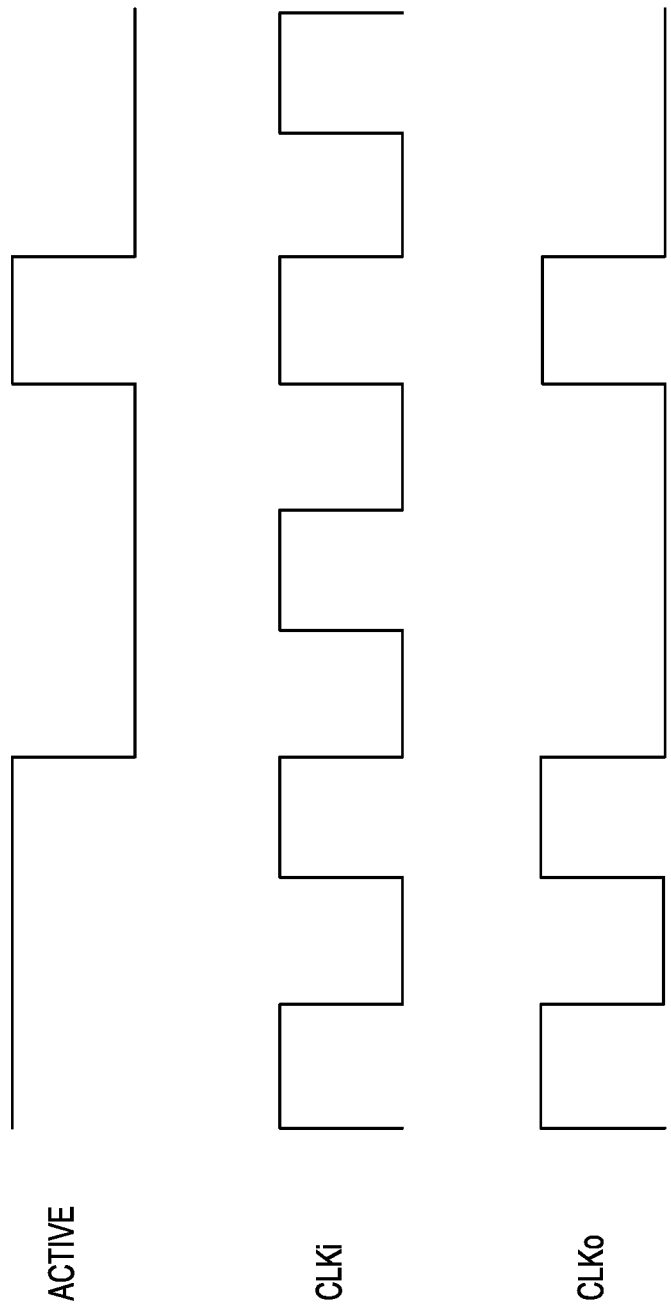
FIG. 14 is a signal diagram illustrating various clock signals and an active signal in accordance with various embodiments of the present technology.

In various embodiments, and referring to FIGS. 13, 14, and 16, the internal clock 710 may be coupled to the clock controller 720. The internal clock 710 may generate an internal clock signal CLKi that alternates between a high voltage and low voltage at a frequency determined by device specifications. The internal clock 710 may alternate at any frequency that may be generated. The internal clock 710 may be configured to generate the internal clock signal CLKi and transmit this internal clock signal CLKi to the clock controller 720. The internal clock 710 may comprise any suitable circuit device and/or circuit for generating an electronic clock signal.

In various embodiments, the clock controller 720 may be coupled to the microphone 110 input and output. The clock controller 720 may receive the internal clock signal CLKi and transmit the external clock signal CLKo that is selectively deactivated into the clock inactive state and reactivated into the clock active state. The clock controller 720 may be configured to receive the internal clock signal CLKi from the internal clock 710 and the digital active signal ACTIVE from the microphone 110.

The clock controller 720 may be further configured to transform the internal clock signal CLKi into the external clock signal CLKo by deactivating the internal clock signal CLKi into the clock inactive state when the digital active signal ACTIVE is in the second state and by reactivating the internal clock signal CLKi into the clock active state when the digital active signal ACTIVE is in the first state. The clock controller 720 may comprise any suitable circuit to activate and deactivate the internal clock signal CLKi to generate the external clock signal CLKo.

In some embodiments, when the digital active signal ACTIVE is in the first state, the digital active signal ACTIVE is high, and when the digital active signal ACTIVE is in the second state, the digital active signal ACTIVE is low. The clock controller 720 may comprise a second AND gate (not shown) to execute the logical AND of the digital active signal ACTIVE and the internal clock signal CLKi. In other embodiments, the digital active signal ACTIVE may control a switch (not shown) that is closed when the digital active signal ACTIVE is in the first state and open when the digital active signal ACTIVE is in the second state. In these other embodiments, when the switch is closed, the internal clock signal CLKi is in the clock active state and when the switch is open, the internal clock signal CLKi is in the clock inactive state.

In various embodiments, the external clock signal CLKo may be transmitted from the clock controller 720 to the microphone 110. The microphone 110 may be configured to transmit the digital voice command signal DATAr-d when the external clock signal CLKo is in the clock active state and prevent transmission of the digital voice command signal DATAr-d when the external clock signal CLKo is in the clock inactive state.

Figure 15:
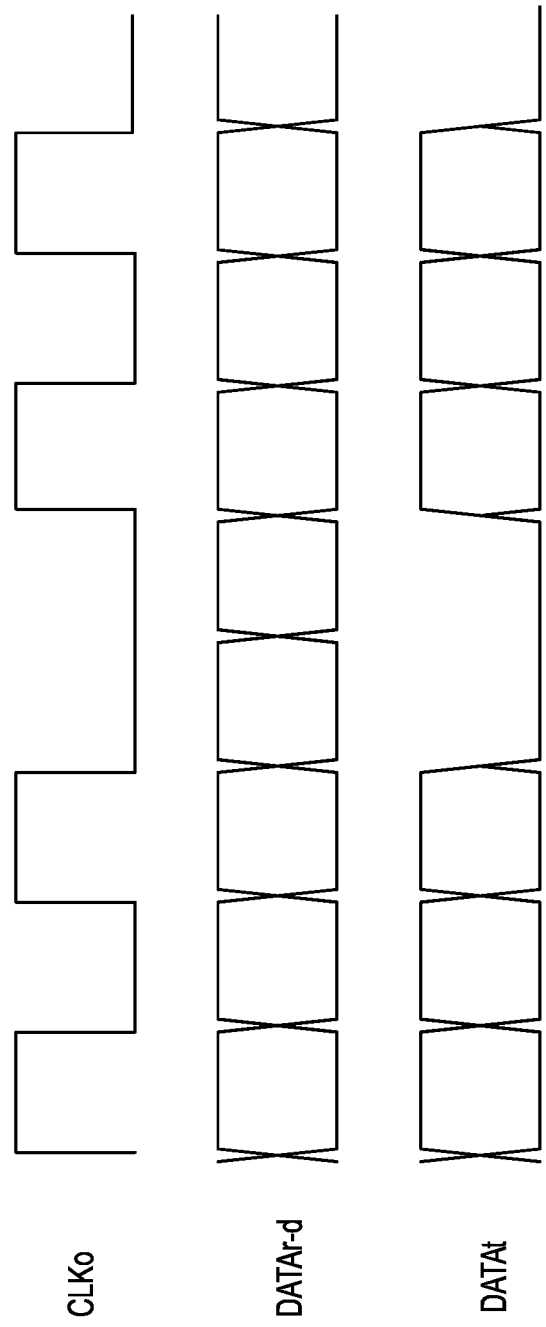
FIG. 15 is a signal diagram illustrating the relationship between audio processor signals in accordance with various embodiments of the present technology.

Referring now to FIGS. 15 and 16, the microphone 110 may transmit the data from the digital voice command signal DATAr-d when the external clock signal CLKo is in the clock active state (e.g., HIGH) and empty gaps during the time that the external clock signal CLKo is in the clock inactive state (e.g., LOW). The portions of data from the digital voice command signal DATAr-d that are actually transmitted are represented by DATAt. DATAt merely illustrates the segments from the digital voice command signal DATAr-d that are prevented from being transmitted to the audio processor 120 and the segments of the digital voice command signal DATAr-d that are actually transmitted to the audio processor 120 and may correspond to the cleaned voice command signal DATAc. Since the external clock signal CLKo permits transmission of the digital voice command signal DATAr-d when the external clock signal CLKo is in the clock active state (e.g., HIGH) and preventing transmission of the digital voice command signal DATAr-d when the external clock signal CLKo is in the clock inactive state (e.g., LOW), power may be saved by only transmitting data corresponding to a word in a voice command and not data (e.g., signal noise data) corresponding to a gap between words.

In various embodiments, the present technology may generate the digital active signal ACTIVE in the analog or digital domain, and may clean the digital voice command signal DATAr-d with the AND gate 250 or may control the microphone 110 transmission of the digital voice command signal DATAr-d with the external clock signal CLKo.

In a first embodiment, referring now to FIG. 11, the microphone 110 may generate the digital active signal ACTIVE in the analog domain with the first active signal generator 225(A) and clean the digital voice command signal DATAr-d with the AND gate 250.

In a second embodiment, referring now to FIG. 12, the microphone 110 may generate the digital active signal ACTIVE in the digital domain with the second active signal generator 225(B) and clean the digital voice command signal DATAr-d with the AND gate 250.

Figure 17:
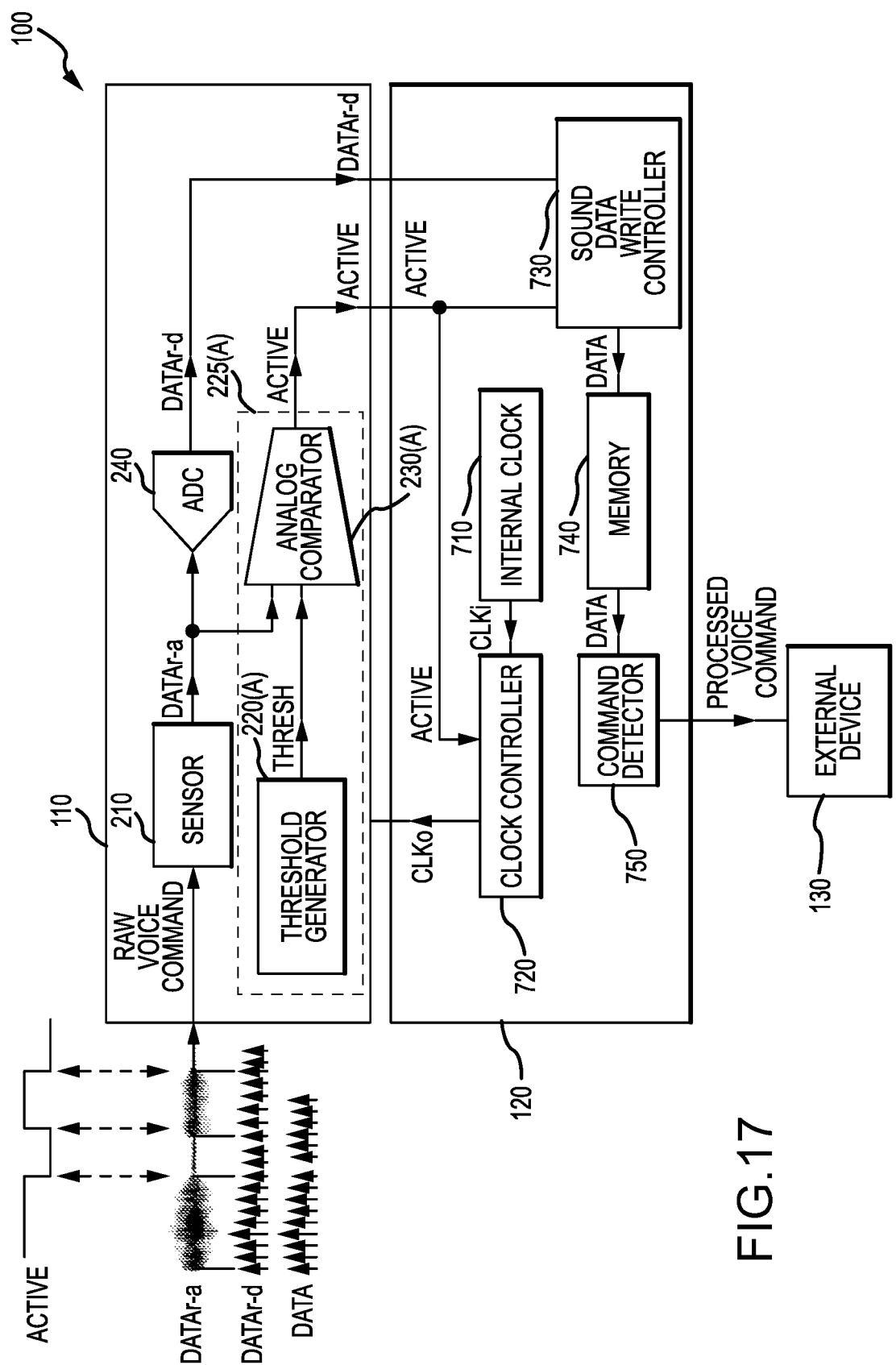
FIG. 17 is a block diagram of an audio system in accordance with a third embodiment of the present technology.

In a third embodiment, referring now to FIG. 17, the microphone 110 may generate the digital active signal ACTIVE in the analog domain with the first active signal generator 225(A) and the external clock signal CLKo may control the microphone 110 transmission of the digital voice command signal DATAr-d.

In some embodiments, the external clock signal CLKo may prevent the microphone 110 from transmitting the digital voice command signal DATAr-d when the external clock signal CLKo is in the clock inactive state (e.g., LOW). The external clock signal CLKo may enable the microphone 110 to transmit the digital voice command signal DATAr-d when the external clock signal CLKo is in the clock active state (e.g., HIGH). The external clock signal CLKo may perform this microphone 110 transmission prevention and microphone 110 transmission enabling with a variety of control devices within the microphone 110.

In some embodiments, the microphone 110 cleaned voice command signal DATAc may pass through a buffer (not shown). In other embodiments, the microphone 110 digital voice command signal DATAr-d may pass through the buffer. The external clock signal CLKo may enable the buffer when the external clock signal CLKo is in the clock active state and the external clock signal CLKo may disable the buffer when the external clock signal CLKo is in the clock inactive state. In other embodiments, the microphone 110 cleaned voice command signal DATAc may pass through a switch (not shown). In other embodiments, the microphone 110 digital voice command signal DATAr-d may pass through the switch. The external clock signal CLKo may open the switch when the external clock signal CLKo is in the clock inactive state and the external clock signal CLKo may close the switch when the external clock signal CLKo is in the clock active state.

Figure 18:
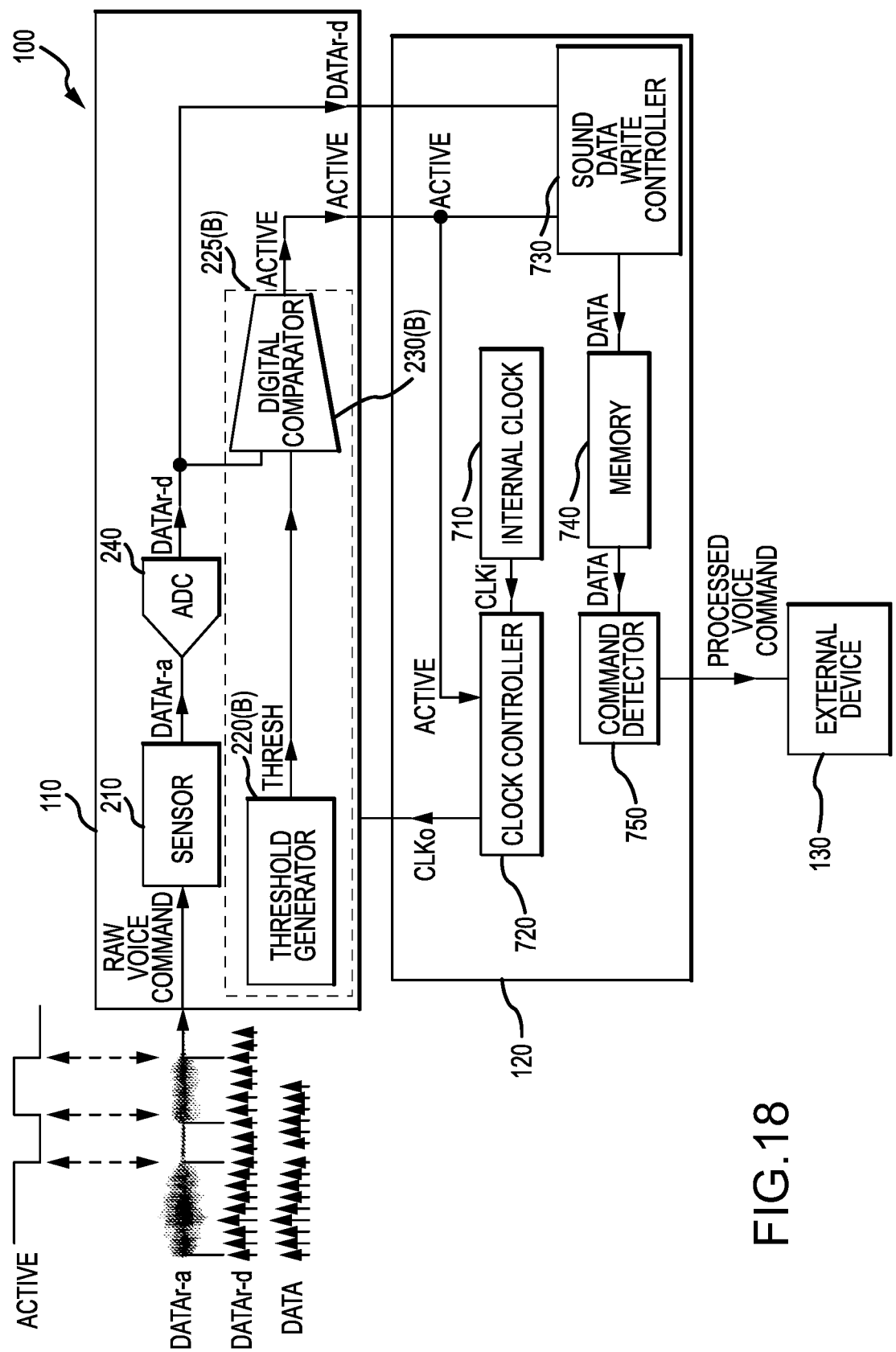
FIG. 18 is a block diagram of an audio system in accordance with a fourth embodiment of the present technology.

In a fourth embodiment, referring now to FIG. 18, the microphone 110 may generate the digital active signal ACTIVE in the digital domain with the second active signal generator 225(B) and the external clock signal CLKo may control the microphone 110 transmission of the digital voice command signal DATAr-d.

In operation, and referring to FIG. 11, the first threshold generator 220(A) and the first comparator 230(A) operate in the analog domain and the AND gate 250 is used to clean the digital voice command signal DATAr-d before transmission to create the transmitted cleaned voice command signal DATAc. The raw voice command is detected by the sensor 210. The sensor 210 then generates the analog voice command signal DATAr-a, which corresponds to the raw voice command.

The first threshold generator 220(A) generates the threshold signal THRESH in the analog domain. The first comparator 230(A) compares the threshold signal THRESH and the analog voice command signal DATAr-a in the analog domain and generates the digital active signal ACTIVE. The digital active signal ACTIVE may be in one of two states. The first state corresponds to the analog voice command signal DATAr-a being greater than the threshold signal THRESH. The second state corresponds to the analog voice command signal DATAr-a being less than the threshold signal THRESH. Various embodiments may configure digital active signal ACTIVE to be in either the first state or the second state when the analog voice command signal DATAr-a is equal to the threshold signal THRESH.

The analog-digital converter 240 converts the analog voice command signal DATAr-a into the digital voice command signal DATAr-d. The AND gate 250 performs the logical AND operation on the digital voice command signal DATAr-d and the digital active signal ACTIVE to create the cleaned voice command signal DATAc wherein the segments of the digital voice command signal DATAr-d corresponding to gaps between words in the raw voice command are reduced to null. The cleaned voice command signal DATAc is transmitted to the sound data write controller 730.

The sound data write controller 730 is configured to permit writing data to the memory 740 when the digital active signal ACTIVE is in the first state and prevent writing data to the memory 740 when the digital active signal ACTIVE is in the second state. When segments of the cleaned voice command signal DATAc corresponding to a word in the raw voice command are received the digital active signal ACTIVE is in the first state and will write data to the memory 740. When segments of the cleaned voice command signal DATAc corresponding to a gap between words in the raw voice command, which the AND gate 250 has nullified, are received the digital active signal ACTIVE is in the second state and will prevent writing data to the memory 740, essentially waiting for the next word in the voice command to permit writing again.

With the sound data write controller 730 writing only the segments of the cleaned voice command signal DATAc corresponding to a word in the raw voice commands, the memory 740 stores the voice command data DATA. The command detector 750 processes the voice command data DATA to determine what command the word or words the voice command DATA stored in the memory 740 correspond to. The command detector 750 may then transmit the processed voice command to the external device 130. The processed voice command comprises the machine instructions for the external device 130 that correspond to the voice command issued by the word or words in the raw voice command.

In an alternative operation, and referring to FIG. 12, the second threshold generator 220(B) and the second comparator 230(B) operate in the digital domain and the AND gate 250 is used to clean the digital voice command signal DATAr-d before transmission to create the transmitted clean voice command signal DATAc. The raw voice command is detected by the sensor 210. The sensor 210 then generates the analog voice command signal DATAr-a, which corresponds to the raw voice command.

The analog-digital converter 240 converts the analog voice command signal DATAr-a into the digital voice command signal DATAr-d. The second threshold generator 220(B) generates the threshold signal THRESH in the digital domain. The second comparator 230(B) compares the threshold signal THRESH and the digital voice command signal DATAr-d in the digital domain and generates the digital active signal ACTIVE. The digital active signal ACTIVE may be in one of two states. The first state corresponds to the digital voice command signal DATAr-d being greater than the threshold signal THRESH. The second state corresponds to the digital voice command signal DATAr-d being less than the threshold signal THRESH. Various embodiments may configure digital active signal ACTIVE to be in either the first state or the second state when the digital voice command signal DATAr-d is equal to the threshold signal THRESH.

The AND gate 250 performs the logical AND operation on the digital voice command signal DATAr-d and the digital active signal ACTIVE to create the cleaned voice command signal DATAc wherein the segments of the digital voice command signal DATAr-d corresponding to gaps between words in the raw voice command are reduced to null. The cleaned voice command signal DATAc is transmitted to the sound data write controller 730.

The sound data write controller 730 is configured to permit writing data to the memory 740 when the digital active signal ACTIVE is in the first state and prevent writing data to the memory 740 when the digital active signal ACTIVE is in the second state. When segments of the cleaned voice command signal DATAc corresponding to a word in the raw voice command are received the digital active signal ACTIVE is in the first state and will write data to the memory 740. When segments of the cleaned voice command signal DATAc corresponding to a gap between words in the raw voice command, which the AND gate 250 has nullified, are received the digital active signal ACTIVE is in the second state and will prevent writing data to the memory 740, essentially waiting for the next word in the voice command to permit writing again as that is when the digital active signal ACTIVE will be in the first state again.

With the sound data write controller 730 writing only the segments of the cleaned voice command signal DATAc corresponding to a word in the raw voice commands, the memory 740 stores the voice command data DATA. The command detector 750 processes the voice command data DATA to determine what command the word or words the voice command DATA stored in the memory 740 correspond to. The command detector 750 may then transmit the processed voice command to the external device 130. The processed voice command comprises the machine instructions for the external device 130 that correspond to the voice command issued by the word or words in the raw voice command.

In yet another alternative operation, and referring to FIG. 17, the first threshold generator 220(A) and the first comparator 230(A) operate in the analog domain and the external clock signal CLKo prevents the microphone 110 from transmitting segments of DATAr-d corresponding to the gaps between words in a voice command. The raw voice command is detected by the sensor 210. The sensor 210 then generates the analog voice command signal DATAr-a, which corresponds to the raw voice command.

The first threshold generator 220(A) generates the threshold signal THRESH in the analog domain. The first comparator 230(A) compares the threshold signal THRESH and the analog voice command signal DATAr-a in the analog domain and generates the digital active signal ACTIVE. The digital active signal ACTIVE may be in one of two states. The first state corresponds to the analog voice command signal DATAr-a being greater than the threshold signal THRESH. The second state corresponds to the analog voice command signal DATAr-a being less than the threshold signal THRESH. Various embodiments may configure digital active signal ACTIVE to be in either the first state or the second state when the analog voice command signal DATAr-a is equal to the threshold signal THRESH.

The internal clock 710 generates the internal clock signal CLKi. The clock controller 720 receives the internal clock signal CLKi and the digital active signal ACTIVE. The clock controller 720 generates the external clock signal CLKo according to the internal clock signal CLKi and the digital active signal ACTIVE. When the digital active signal ACTIVE is in the first state, which corresponds to a word in the raw voice command, the external clock signal CLKo is in the clock active state. When the digital active signal ACTIVE is in the second state, which corresponds to a gap between words in the raw voice command, the external clock signal CLKo is in the clock inactive state. The external clock signal CLKo remains in the clock inactive state until the digital active signal ACTIVE is again in the first state, which reactivates CLKo into the clock active state. The external clock signal CLKo is transmitted to the microphone 110.

The analog-digital converter 240 converts the analog voice command signal DATAr-a into the digital voice command signal DATAr-d. The microphone 110 permits transmission of the digital voice command signal DATAr-d when the external clock signal CLKo is active, and prevents transmission of the digital voice command signal DATAr-d when the external clock signal CLKo is inactive. Accordingly, the microphone 110 only transmits segments of the digital voice command signal DATAr-d corresponding to a word in the raw voice command to the sound data write controller 730.

The sound data write controller 730 is configured to permit writing data to the memory 740 when the digital active signal ACTIVE is in the first state and prevent writing data to the memory 740 when the digital active signal ACTIVE is in the second state. When segments of the digital voice command signal DATAr-d corresponding to a word in the raw voice command are received, the digital active signal ACTIVE is in the first state and the sound data write controller 730 will write voice command data DATA to the memory 740. When segments of the digital voice command signal DATAr-d corresponding to a gap between words in the raw voice command occur, the digital active signal ACTIVE is in the second state and will prevent writing data to the memory 740, essentially waiting for the next word in the voice command to permit writing again.

With the sound data write controller 730 writing only the segments of the digital voice command signal DATAr-d corresponding to a word in the raw voice commands, the memory 740 stores the voice command data DATA. The command detector 750 processes the voice command data DATA to determine what command the word or words the voice command DATA stored in the memory 740 correspond to. The command detector 750 may then transmit the processed voice command to the external device 130. The processed voice command comprises the machine instructions for the external device 130 that correspond to the voice command issued by the word or words in the raw voice command.

In yet another alternative operation, and referring to FIG. 18, the second threshold generator 220(B) and the second comparator 230(B) operate in the digital domain and the external clock signal CLKo prevents the microphone 110 from transmitting segments of DATAr-d corresponding to the gaps between words in a voice command. The raw voice command is detected by the sensor 210. The sensor 210 then generates the analog voice command signal DATAr-a, which corresponds to the raw voice command.

The analog-digital converter 240 converts the analog voice command signal DATAr-a into the digital voice command signal DATAr-d. The second threshold generator 220 (B) generates the threshold signal THRESH in the digital domain. The second comparator 230(B) compares the threshold signal THRESH and the digital voice command signal DATAr-d in the digital domain and generates the digital active signal ACTIVE. The digital active signal ACTIVE may be in one of two states. The first state corresponds to the digital voice command signal DATAr-d being greater than the threshold signal THRESH. The second state corresponds to the digital voice command signal DATAr-d being less than the threshold signal THRESH. Various embodiments may configure digital active signal ACTIVE to be in either the first state or the second state when the digital voice command signal DATAr-d is equal to the threshold signal THRESH.

The internal clock 710 generates the internal clock signal CLKi. The clock controller 720 receives the internal clock signal CLKi and the digital active signal ACTIVE. The clock controller 720 generates the external clock signal CLKo according to the internal clock signal CLKi and the digital active signal ACTIVE. When the digital active signal ACTIVE is in the first state, which corresponds to a word in the raw voice command, the external clock signal CLKo is active. When the digital active signal ACTIVE is in the second state, which corresponds to a gap between words in the raw voice command, the external clock signal CLKo is deactivated. The external clock signal CLKo remains deactivated until the digital active signal ACTIVE is again in the first state, which reactivates CLKo.

The microphone 110 permits transmission of the digital voice command signal DATAr-d when the external clock signal CLKo is active, and prevents transmission of the digital voice command signal DATAr-d when the external clock signal CLKo is inactive. Accordingly, the microphone 110 only transmits segments of the digital voice command signal DATAr-d corresponding to a word in the raw voice command to the sound data write controller 730.

The sound data write controller 730 is configured to permit writing data to the memory 740 when the digital active signal ACTIVE is in the first state and prevent writing data to the memory 740 when the digital active signal ACTIVE is in the second state. When segments of the digital voice command signal DATAr-d corresponding to a word in the raw voice command are received the digital active signal ACTIVE is in the first state and the sound data write controller 730 will write voice command data DATA to the memory 740. When segments of the digital voice command signal DATAr-d corresponding to a gap between words in the raw voice command occur, the digital active signal ACTIVE is in the second state and will prevent writing data to the memory 740, essentially waiting for the next word in the voice command to permit writing again.

With the sound data write controller 730 writing only the segments of the digital voice command signal DATAr-d corresponding to a word in the raw voice commands, the memory 740 stores the voice command data DATA. The command detector 750 processes the voice command data DATA to determine what command the word or words the voice command DATA stored in the memory 740 correspond to. The command detector 750 may then transmit the processed voice command to the external device 130. The processed voice command comprises the machine instructions for the external device 130 that correspond to the voice command issued by the word or words in the raw voice command.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A voice detection system, comprising:
a microphone configured to:
receive a voice command;
compare the voice command against a threshold value;
generate a signal, wherein the signal comprises:
a first state when the voice command is greater than the threshold value; and
a second state when the voice command is less than the threshold value and corresponds to a gap between words in the voice command;
generate a cleaned voice command wherein the cleaned voice command matches the voice command when the signal is in the first state, and wherein the cleaned voice command is set to a predetermined value when the signal is in the second state; and
an audio processor, coupled to the microphone, comprising:
a sound data controller, configured to:
write data from the cleaned voice command to a memory when the cleaned voice command is not equal to the predetermined value; and
prevent writing data from the cleaned voice command to a memory when the cleaned voice command is equal to the predetermined value; and
a clock controller, coupled to the microphone, and configured to:
generate an external clock signal based on the signal and an internal clock signal; and
control a mode of operation of the microphone according to the external clock signal.

2. The voice detection system of claim 1, wherein the microphone comprises:
a threshold generator, configured to generate a threshold value; and
a threshold comparator, coupled to the threshold generator.

3. The voice detection system claim 2, wherein the threshold generator is reprogrammable by at least one of a user of the voice detection system and an external device connected to the audio processor.

4. The voice detection system of claim 1, wherein the audio processor further comprises:
a command detector, coupled to the memory, and configured to generate a processed voice command corresponding to the voice command represented in the data stored in the memory.

5. The voice detection system of claim 1, wherein the microphone further comprises an analog-digital converter configured to convert the voice command into a digital voice command.

6. The voice detection system of claim 5, wherein the microphone further comprises an AND circuit configured to perform the logical AND of the digital voice command and the signal to convert the digital voice command into a cleaned digital voice command.

7. The voice detection system of claim 1, wherein the external clock signal prevents the microphone from transmitting the voice command when the external clock signal is inactive.

8. A method for detecting and processing an audio command, comprising
generating an analog signal with a microphone in response to the audio command;
generating a threshold value;
comparing the analog signal to the threshold value;
generating a digital signal based on the comparison of the analog signal and the threshold value, wherein the digital signal matches the analog signal when the analog signal is greater than the threshold value, and wherein the digital signal is set to a predetermined value when the analog signal is less than the threshold value;
transmitting the digital signal to an audio processor; and
controlling operation of the audio processor based on the digital signal, comprising:
storing data, representing the audio command, in a memory according to the digital signal when the digital signal is not equal to the predetermined value;
preventing data, representing the audio command, from being stored in the memory when the digital signal is equal to the predetermined value; and
generating an external clock signal according to:
the digital signal; and
an internal clock signal; and
transmitting the external clock signal to the microphone, wherein the external clock signal controls a mode of operation of the microphone.

9. The method of claim 8, wherein the predetermined value comprises a LOW signal value.

10. The method of claim 8, wherein controlling operation of the audio processor based on the digital signal further comprises:
performing audio command detection with a signal processor according to the digital signal; and
preventing audio command detection with the signal processor according to the digital signal.

11. The method of claim 8, wherein:
storing data in the memory according to the digital signal comprises enabling a controller when the digital signal is not equal to the predetermined value; and
preventing data from being stored in the memory according to the digital signal comprises disabling the controller when the digital signal is equal to the predetermined value.

12. An audio system, comprising:
a digital microphone, configured to receive an analog voice command, comprising:
a threshold generator, configured to generate a threshold value; and
a comparator, coupled to the threshold generator, and configured to:
compare the analog voice command against the threshold value; and transmit a digital signal that is in a first state when the analog voice command is greater than the threshold value and that is in a second state when the analog voice command is less than the threshold value and corresponds to a gap between words in the analog voice command; and a signal generator to generate a cleaned voice command wherein the cleaned voice command matches the analog voice command when the digital signal is in the first state, and wherein the cleaned voice commands is set to a predetermined value when the digital signal is in the second state; and an audio processor, coupled to the digital microphone, comprising:
  a write controller, configured to:
    write data from the cleaned voice command to a memory when the cleaned voice command is not equal to the predetermined value; and
    prevent writing data from the cleaned voice command to the memory when the cleaned voice command is equal to the predetermined value; and
  a clock controller, coupled to the digital microphone, and configured to:
    generate an external clock signal based on the digital signal and an internal clock signal; and
    control a mode of operation of the digital microphone according to the external clock signal.

13. The audio system of claim 12, wherein the audio processor further comprises a digital signal processor, coupled to the memory, and configured to generate a processed voice command corresponding to the analog voice command.

14. The audio system of claim 13, further comprising an external device, wherein the external device is coupled to the audio processor and is configured to respond to the processed voice command.

15. The audio system of claim 12, wherein the threshold value is reprogrammable by a user of the audio system.

16. The audio system of claim 12, wherein the digital signal comprises, at most, a HIGH signal value and the predetermined value is a LOW signal value.

17. The audio system of claim 12, wherein the external clock signal is HIGH only when the digital signal is not equal to the predetermined value and the internal clock signal is HIGH.

* * * * *